United States Patent [19]

Bastiaens et al.

[11] Patent Number: 5,082,726
[45] Date of Patent: Jan. 21, 1992

[54] INTERNAL MANIFOLD THAT AIDS IN FILLING MOLDS

[75] Inventors: Alfons Bastiaens, Westerlo; Norbert Pauwels, Herselt, both of Belgium

[73] Assignee: Grace N.V., Westerlo, Belgium

[21] Appl. No.: 430,537

[22] Filed: Nov. 1, 1989

[51] Int. Cl.⁵ .................................................. B32B 3/26
[52] U.S. Cl. .................................. 428/313.3; 264/41; 428/313.5; 428/313.9
[58] Field of Search ............ 264/41; 428/313.3, 313.5, 428/313.9

[56] References Cited

U.S. PATENT DOCUMENTS

| | | | |
|---|---|---|---|
| 3,622,437 | 11/1971 | Hobalca | 428/34.5 |
| 3,705,432 | 12/1972 | Watkins | 248/230 |
| 3,707,434 | 12/1972 | Stayner | 428/313.5 |
| 3,729,756 | 5/1973 | Cook et al. | 441/133 |
| 3,996,654 | 12/1976 | Johnson | 29/458 |
| 4,021,589 | 5/1977 | Copley | 428/68 |
| 4,623,584 | 11/1986 | Masui et al. | 428/304.4 |
| 4,753,837 | 6/1988 | Hanusa | 428/86 |
| 4,783,294 | 11/1988 | Kimura et al. | 264/45.3 |

*Primary Examiner*—William J. Van Balen
*Attorney, Agent, or Firm*—Kevin S. Lemack; William L. Baker

[57] ABSTRACT

A process of forming buoyant structures is disclosed, whereby a manifold is positioned in a buoyant structure mold so as to define a space therein that is devoid of buoyant bodies. The mold can then be filled with a resin/microsphere mix that meets minimal resistivity in the devoid space along the length of the manifold. A reduction in mold fill-time is achieved. The resulting buoyant bodies exhibit improved quality.

11 Claims, 2 Drawing Sheets

INTERNAL MANIFOLD THAT AIDS IN FILLING MOLDS

BACKGROUND OF THE INVENTION

This invention relates to improvements in buoyant structures of the type particularly useful in undersea environments and improvements in their manufacture.

U.S. Pat. No. 3,622,437 to Sidney D. Cook, the disclosure of which is incorporated herein by reference, discloses a buoyancy material which exemplifies the type of structure with which the present invention is concerned. The structure disclosed therein comprises a plurality of generally spherical, low density, buoyant bodies encased in a matrix of a lightweight material known as syntactic foam, i.e., a hardenable resin loaded with hollow microspheres which serve to lower its density.

Such buoyant materials have found many uses as the sea has increasingly been utilized as a resource. For example, they are used to impart buoyancy to submergible equipment such as deep sea research instruments, cables, pipelines, and marine riser pipe such as are used in off-shore oil drilling operations. Their commercial success may be traced primarily to the fact that they provide a relatively inexpensive buoyancy material which is capable of withstanding relatively high hydrostatic pressures. Furthermore, unlike single-walled hollow pressure vessels which are subject to catastrophic failure when the wall is penetrated, the buoyancy materials with which the instant invention is concerned comprise a compartmentalized structure which tends to localize any failure due to implosion and thereby to retain most of its buoyancy.

It is well known that strength and impact resistance of buoyant materials of the type described may be improved by applying a protective skin, e.g., a fiberglass resin laminate. However, this type of skin, which must be excessively thick in order to provide suitable protection to the buoyant bodies, is characterized by a substantially increased weight.

U.S. Pat. No. 4,021,589 to Copley discloses a buoyancy material having a layered integral skin which comprises an inner layer of syntactic foam of a thickness sufficient to prevent implosion of buoyant bodies located in the outer portions of the buoyancy material when subjected to a desired hydrostatic pressure, and an outer layer of resin permeated reinforcing material to add strength and protect the buoyant core and the inner layer against impact damage. The outer layer of the skin also aids in preventing implosion of the buoyant bodies at desired hydrostatic pressure, but, due to the fact that it is much thinner than the inner layer of the skin, its effect in this regard is minor. The inner layer may contain a spacer means imbedded in the resin which functions to retain the buoyant bodies inwardly from the surface of the finally formed article during its manufacture. The spacer means comprises a composition of enmeshed filamentary material, e.g., fibers of plastic, such as is manufactured by American Enka Corp. and sold under the trademark ENKAMAT®. The skin, including the spacer means, is coextensive with the buoyancy material, and thus deleteriously increases the weight of the buoyancy module.

The aforementioned buoyant materials have previously been manufactured by packing hollow or foam filled, thin walled, generally spherical buoyant bodies ranging, in general, from one-sixteenth inch to about 6 inches in diameter, in a mold of a desired shape, and thereafter filling through a plurality of fill holes the interstices among the buoyant bodies with a syntactic foam. The syntactic foam serves as a matrix to encase the implodable buoyant bodies and reinforces the walls thereof. However, the use of multiple fill holes as well as other factors involved in the manufacture of the buoyant bodies has resulted in the presence of air voids in the final product. In addition, the implodable buoyant bodies, which are a relatively bulky filler, tend to impede the flow of the resin, which results in the discontinuous distribution of the syntactic foam filler. A plurality of fill holes can be used in an attempt to evenly distribute the resin, but this can add to the air-entrapment problem. Moreover, the use of a plurality of fill holes does not completely eliminate the discontinuous distribution of the resin, and it leads to excessive time and labor associated with connecting and disconnecting the numerous fill holes from the foam supply container.

SUMMARY OF THE INVENTION

The problems of the prior art have been overcome by the instant invention, which provides a manifold in a buoyant structure mold. The manifold is positioned in the mold to define volume therewith which is devoid of the buoyant bodies bulky filler. This allows at least a substantial portion of the resin/microsphere mix to flow with minimal resistivity along the length of the manifold and then down through the bulky filler to complete the filling of the mold. The resulting free-flow filling system stays as an integrated piece in the finished product and will enable reduction in manufacturing costs, while simultaneously increasing product quality and process capacity. In addition, one filling hole can be advantageously used, thereby lessening the aforementioned air-entrapment problems, yet still achieving a reduction in fill time.

It is therefore an object of the instant invention to provide a buoyant structure and process for its manufacture that allows for improved distribution of the resin/microsphere mix throughout the mold.

Another object of the present invention is to provide such a process which reduces air entrapment problems.

Still another object of the present invention is to provide a process for manufacturing a buoyant structure that requires only one fill hole.

Still another object of the present invention is to provide a process for manufacturing a buoyant structure that requires less filling time and less equipment for filling the resin/microsphere mix into the mold.

These and other objects and features of the invention will be apparent from the following description and drawings.

DETAILED DESCRIPTION OF THE INVENTION

The present invention provides resin distribution means in a buoyant structure which is strategically located so as to provide volume free of bulky filler where the resin/microsphere mix can readily flow prior to encountering bulky filler. In this manner, the resin/microsphere mix is distributed substantially along the length of the buoyant structure mold before it is impeded by bulky filler. This permits continuous distribution of the resin mix even after bulky filler is encountered, allows much faster filling rates, and allows the use of only one filling hole which minimizes air-entrapment problems and the time needed to connect and disconnect a mold from the foam supply. A preferred method for introducing the syntactic foam (hardenable resin containing microspheres) into the mold is to employ a process wherein a vacuum is maintained within the mold, and the resin/microsphere mix is forced into the mold cavity by atmospheric pressure or higher than atmospheric pressure.

Figure 1:
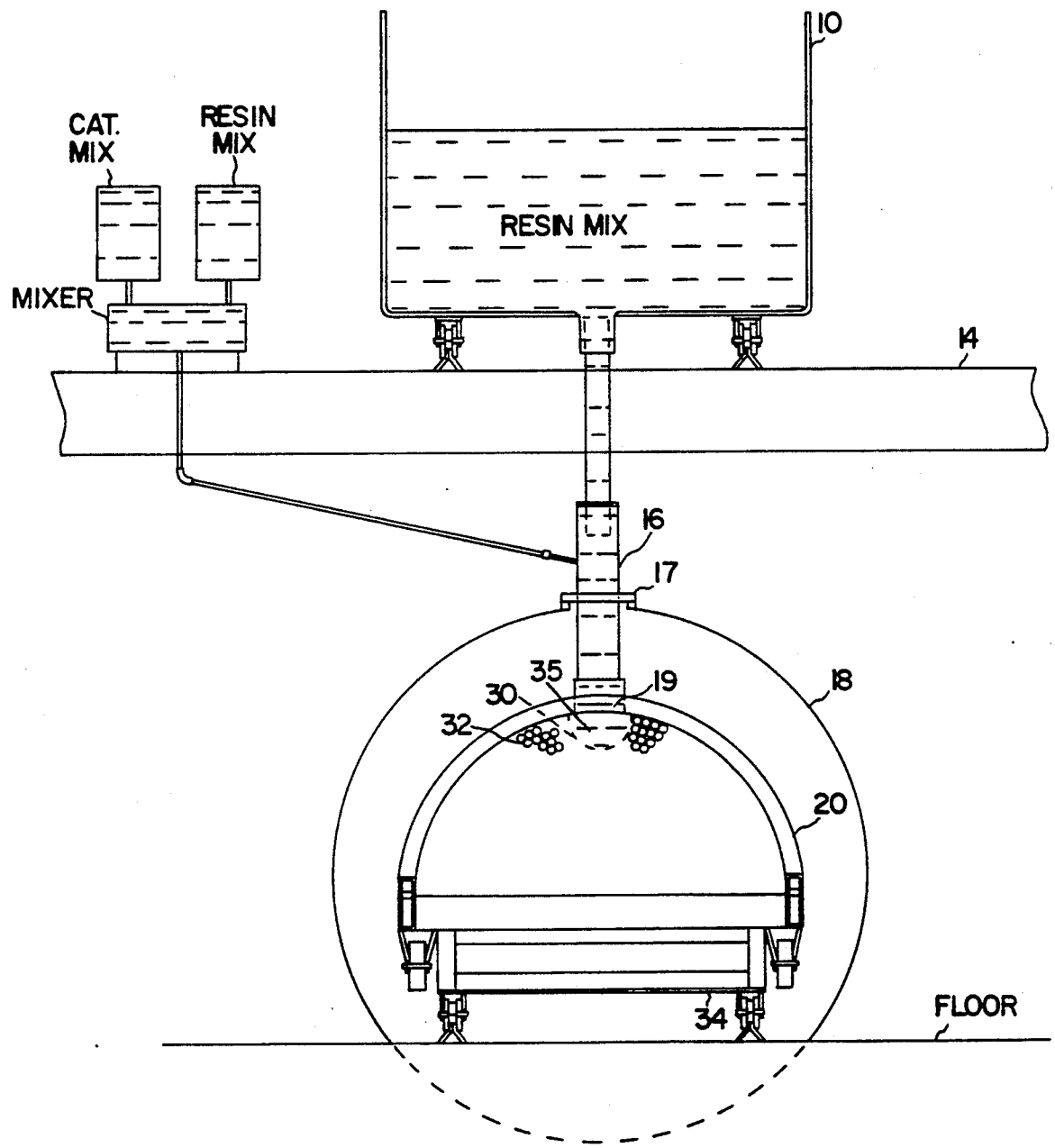
FIG. 1 is a schematic representation of apparatus used in manufacturing a buoyant structure in accordance with the present invention.

Turning how to FIG. 1, there is shown a mixing bowl 10. The contents of the bowl 10 comprise a mixture of hardenable resin and microspheres to reduce the resin density. Suitable resins include epoxy, polyester, urethane, phenolic or the like. Many different types of microspheres may be incorporated in a resinous material to form a suitable syntactic foam. Suitable microspheres are disclosed in U.S. Pat. No. 2,797,201 to F. Veatch et al and U.S. Pat. No. 3,247,158 to H. E. Alford et al and are commercially available from, for example Emerson & Cuming, Inc., Canton, Massachusetts, sold under the trademark "Microballoons ®". Typically, these microspheres range from 5 to 500 microns in diameter and may be made of ceramic, glass, or film-forming polymeric materials. The bowl 10 is shown on a platform located above the mold 20. It is preferable that the distance between bowl 10 and mold 20 be kept to a minimum to reduce the amount of waste material. Pipe means 16 extends from the bottom of bowl 10 through an aperture 17 in vacuum tank 18, and through a fill hole 19 in mold 20 so as to provide resin communication from bowl 10 to the interior of mold 20. The pipe means 16 can comprise a telescopic pipe assembly having suitable O-ring seals to prevent leakage. Should additional infiltration of resin be necessary, a second source of resin and catalyst can be mixed and added to pipe means 16 as shown. A manifold 30 is shown positioned in the mold 20 in proximity to the fill hole 19 in such a manner so as to receive and distribute in the longitudinal direction of the mold the resin microsphere mixture discharged through pipe means 16. The volume 35 located above manifold 30 is devoid of buoyant bodies 32 which facilitates the resin distribution. The remainder of mold 20 is filled with buoyant bodies 32. The mold 20 may be located on a motorized cart 34 for ease in transporting the mold.

The buoyant bodies are of a nature well known in the art. They may be of any convenient size and, often, several different sizes are used to achieve close packing. Typical densities are 12 and 16 pcf. Suitable buoyant bodies may be fabricated from phenolic, polyester, epoxy, or thermoplastic resins. They may or may not be fiberglass reinforced. They may be either hollow or filled with low density foam. Such structures are available commercially from, for example, Emerson & Cuming, Inc. under the trademarks "Eccospheres ® EP" and "Eccospheres ® HB".

Various designs and configurations of the manifold are possible. For example, a double layer of open-weave, filamentary mat could be used, with the layer closest to the fill hole being narrower than the other. The narrower layer can be positioned on the wider layer to provide curvature to the latter. Factors involved in determining the appropriate configuration include the size of the resin distribution means necessary to speed the filling process, and the size and shape of the mold. For molds that are more square than that shown in FIG. 1, it is preferred that the manifold be sized and positioned so that the resin travels along its width as well as its length.

Figure 2:
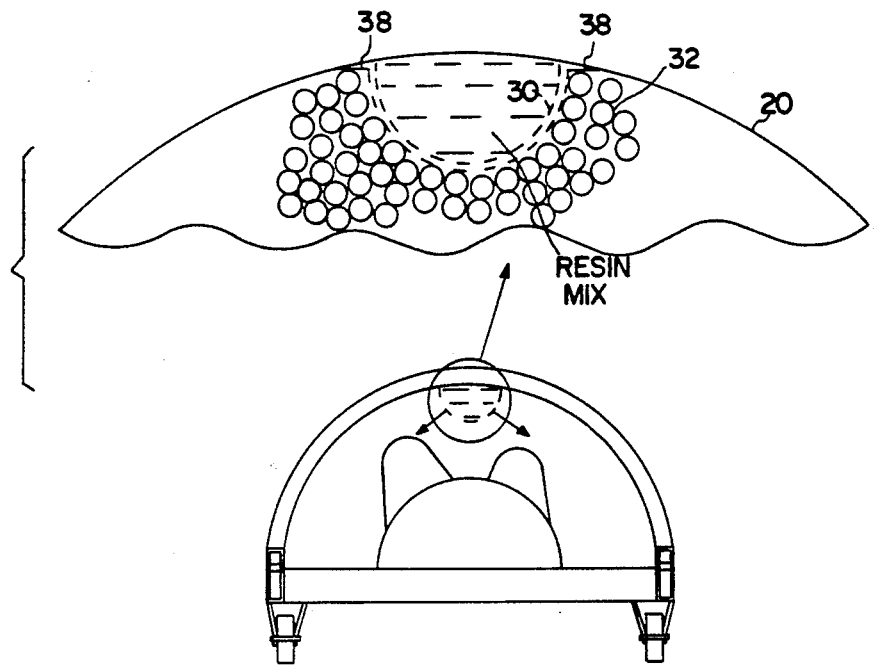
FIG. 2 is a cross-sectional view of a buoyant structure of the present invention, with the manifold portion shown in enlarged detail.

FIG. 2 shows in enlarged detail the manifold 30. It is shown placed in mold 20 in a semi-cylindrical fashion, although any shape can be defined as long as sufficient space, devoid of buoyant bodies, is provided to allow the resin/microsphere mixture to be distributed along the manifold length with minimal resistance. Suitable volumes devoid of buoyant bodies include a range from about 0.5 to about 0.8 cubic feet. The manifold 30 can be secured to the mold 20 by legs 36, 38 by any suitable means, such as bolts.

Figure 3:
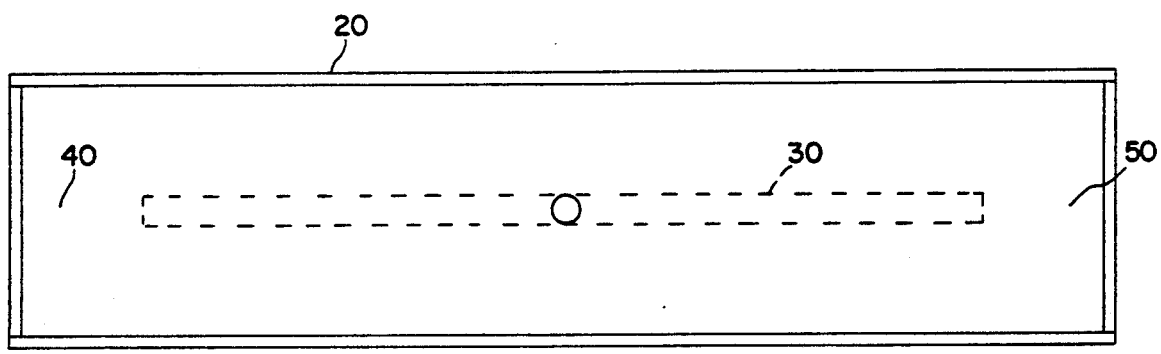
FIG. 3 is a top cross-sectional view of a buoyant structure of the present invention.

As shown in FIG. 3, the manifold 30 preferably does not extend along the entire length of mold 20. The spaces 40, 50 provide tunnels through which the resin/microsphere mix can flow and penetrate the bulky filler. The manifold can be designed to extend to the ends of the mold where the configuration of the mold so dictates.

Although any suitable material can be used as a manifold, one preferred material is an open weave thermoplastic mat-like structure such as ENKAMAT ®. The Enkamat ® material can be epoxy dipped and cured to add strength thereto. The manifold can be porous to the resin/microsphere mix so as to allow a portion of the mix to flow therethrough, which can aid in the continuous distribution of the resin mix. Another suitable manifold material is rigid-walled tubing, installed in a semi-cylindrical shape or semi-rectangular shape to form a gutter or trough through which the resin/microsphere mix can flow. Grooves or holes must be provided in the gutter to allow the mix to flow therethrough and enter the mold cavity. The grooves or holes provided in a gutter or any openings in the filamentary mat should be small enough so as not to allow the penetration of buoyant bodies.

The invention is further illustrated but is not intended to be limited by the following example.

EXAMPLE 1

An epoxy-dipped fiberglass gutter in the form of a half cylindrical tube and having a diameter of 75 mm and a length of 4200 mm was attached to a mold by means of bolts. Grooves were formed in the gutter 7 mm wide and 50 mm long in the longitudinal direction, which allow the infiltration of resin but prohibit the passage of buoyant bodies. The volume formed in the mold below the gutter and away from the fill hole was filled with hollow plastic macrospheres. The mold was filled with an epoxy resin mixed with glass microspheres in 7 minutes, as contrasted to 30 to 40 minutes typically required by prior art methods.

The mold was opened and the module was removed and split for inspection. The module showed no air voids in the core, and the gutter showed no signs of crushing by the buoyant bodies.

EXAMPLE 2

Two buoyancy modules were made according to the following procedure. An Enkamat manifold 105" long, 12" wide and 1.50" thick was installed in a mold having a 45" diameter and a 141" length by attaching the edges of the manifold to a fiberglass mat installed on the inner mold surface. The mold was filled with hollow plastic macrospheres, except in the volume defined by the manifold and in Proximity to the mold fill hole. The mold was then filled with syntactic foam comprising an epoxy resin mixed with glass microspheres.

Pressure tests were carried out in the above modules. The duration of the test was 98.5 hours, which consisted of 2 hours pressurization, 96 hours constant pressure at 1470 psi, and 36 minutes depressurization. The results are summarized in Table 1.

COMPARATIVE EXAMPLE

Three buoyancy modules were prepared using the same macrospheres and syntactic foam as in Example 2. No manifold was employed; the macrospheres filled the entire mold cavity.

Pressure tests conducted on these modules gave the results shown in Table 1.

TABLE 1

|  | Example 2 Sample 1 | Example 2 Sample 2 | Comparative Samples | | |
| --- | --- | --- | --- | --- | --- |
|  |  |  | 1 | 2 | 3 |
| F. W. Buoyancy Before Test (lbs) | 1410 | 1407 | 1220 | 1222 | 1234 |
| Buoyancy Loss at 1470 psi (%) | 1.53 | 1.64 | 1.93 | 2.09 | 1.99 |
| Buoyancy Loss at 0 psi (%) | 0.48 | 0.57 | 0.47 | 1.10 | 1.14 |
| Elastic Recovery (%) | 1.050 | 1.07 | 1.46 | 0.99 | 0.85 |
| Initial Air Weight (lbs) | 1035 | 1051 | 908 | 919 | 908 |
| Final Air Weight (lbs) | 1041 | 1056 | 913 | 926 | 912 |
| Weight Gain (lbs) | 6 | 5 | 5 | 7 | 6 |
| Weight Gain (%) | 0.58 | 0.48 | 0.55 | 0.76 | 0.66 |
| Projected Buoyancy Loss in 12 Months (%) | 1.99 | 2.09 | 2.91 | 3.39 | 2.92 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for filling a mold, comprising:
   a). providing a hollow mold having surfaces defining a cavity, said hollow mold having resin receiving means;
   b). providing a resin distribution means in said mold in proximity to said resin receiving means, said resin distribution means defining with said mold surfaces at least a first volume and a second volume;
   c). filling said second volume with a plurality of buoyant bodies while maintaining said first volume devoid of buoyant bodies; and
   d). filling said mold with said resin through said resin receiving means, whereby a substantial portion of said resin is distributed in said first volume devoid of buoyant bodies prior to reaching said second volume.

2. The process of claim 1 wherein said resin includes microspheres.

3. The process of claim 1 wherein said resin distribution means comprises enmeshed filamentary material.

4. The process of claim 3 wherein said enmeshed filamentary material is coated with epoxy.

5. The process of claim 1 wherein said resin distribution means comprises rigid walled tubing.

6. The process of claim 1 wherein said first volume is smaller than said second volume.

7. The product formed by the process of claim 1.

8. A buoyant structure comprising a first volume consisting essentially of syntactic foam and a second volume comprising a plurality of buoyant bodies encased in a matrix of syntactic foam, said foam comprising a hardenable resin and a multiplicity of hollow microspheres.

9. The buoyant structure of claim 8 wherein said first volume is smaller than said second volume.

10. The buoyant structure of claim 8 wherein said first and second volumes are separated by a composition comprising rigid-walled tubing.

11. The buoyant structure of claim 8 wherein said first and second volumes are separated by a composition comprising enmeshed filamentary material.

* * * * *